United States Patent [19]
Ihrke et al.

[11] 3,722,352
[45] Mar. 27, 1973

[54] PITCH MEASUREMENT CIRCUIT

[76] Inventors: Elmer A. Ihrke, 4619 N. Cramer St., Milwaukee, Wis. 53211; Walter R. Ihrke, 25 Storrs Heights Rd., Storrs, Conn. 06268

[22] Filed: Aug. 16, 1971

[21] Appl. No.: 172,051

[52] U.S. Cl. .................................................. 84/454
[51] Int. Cl. ............................................. G10g 7/02
[58] Field of Search .............................. 84/454, 464

[56] References Cited

UNITED STATES PATENTS

| | | | |
|---|---|---|---|
| 2,207,450 | 7/1940 | Bergan et al. | 84/454 |
| 3,180,199 | 4/1965 | Anderson | 84/454 |
| 3,598,889 | 8/1971 | Switsen | 84/464 X |
| 2,919,620 | 1/1960 | Dorf | 84/454 |
| 3,144,802 | 8/1964 | Faber et al. | 84/454 |
| 3,163,077 | 12/1964 | Shank | 84/464 |

*Primary Examiner*—Richard B. Wilkinson
*Assistant Examiner*—Lawrence R. Franklin
*Attorney*—Arthur L. Morsell, Jr. et al.

[57] ABSTRACT

The pitch measurement circuit, in conjunction with a two-track tape recorder and a printed instruction manual, provides a method whereby proficiency in pitch accuracy can be developed. The method is self-instructional in that the student performs into a microphone either vocally or by means of a single-tone musical instrument. The human teacher is absent, and speaks only through the manual and the tape. The student reads the music of the training items from the manual, and performs it against a setting sounded by the tape. Track 1 is an accompaniment to the student's performance. Track 2, which the student does not hear, contains the melody in coded form, each coded tone being 40 cycles less than the corresponding tone of the melody. The student's performance is sent from a microphone into a mixer circuit which also receives the coded melody from Track 2. The resulting mixture is demodulated, and the low-frequency component is sent to a group of frequency discriminators which by means of lights indicate whether the student is sharp, flat, or on pitch.

8 Claims, 3 Drawing Figures

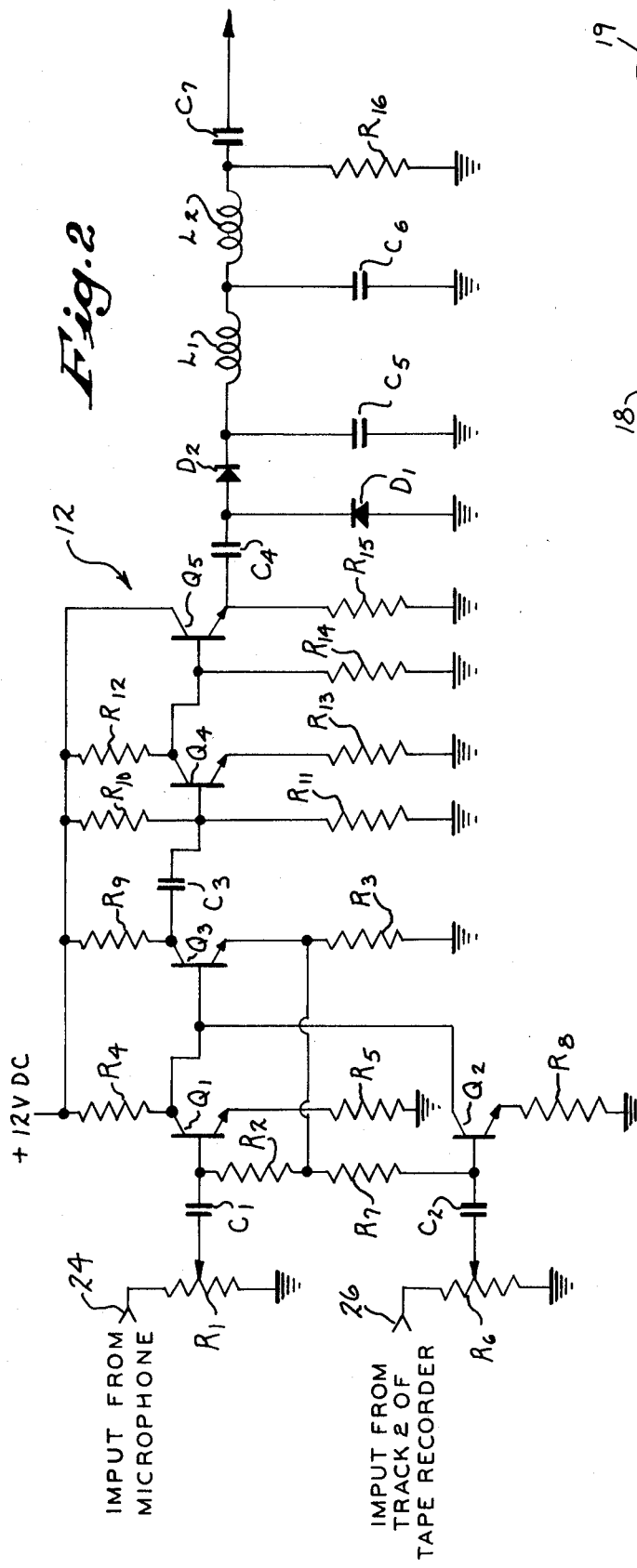
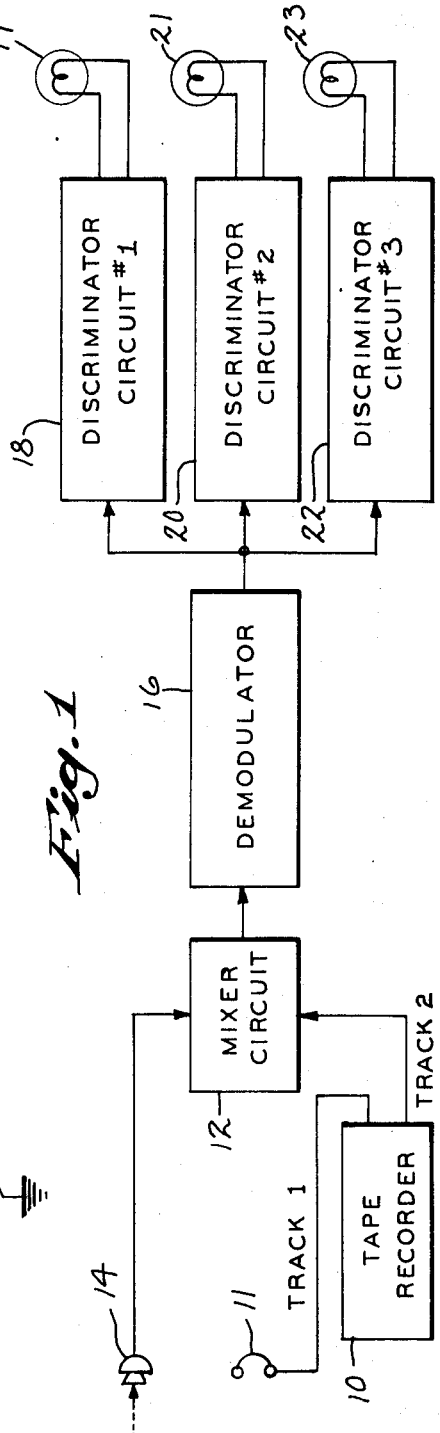

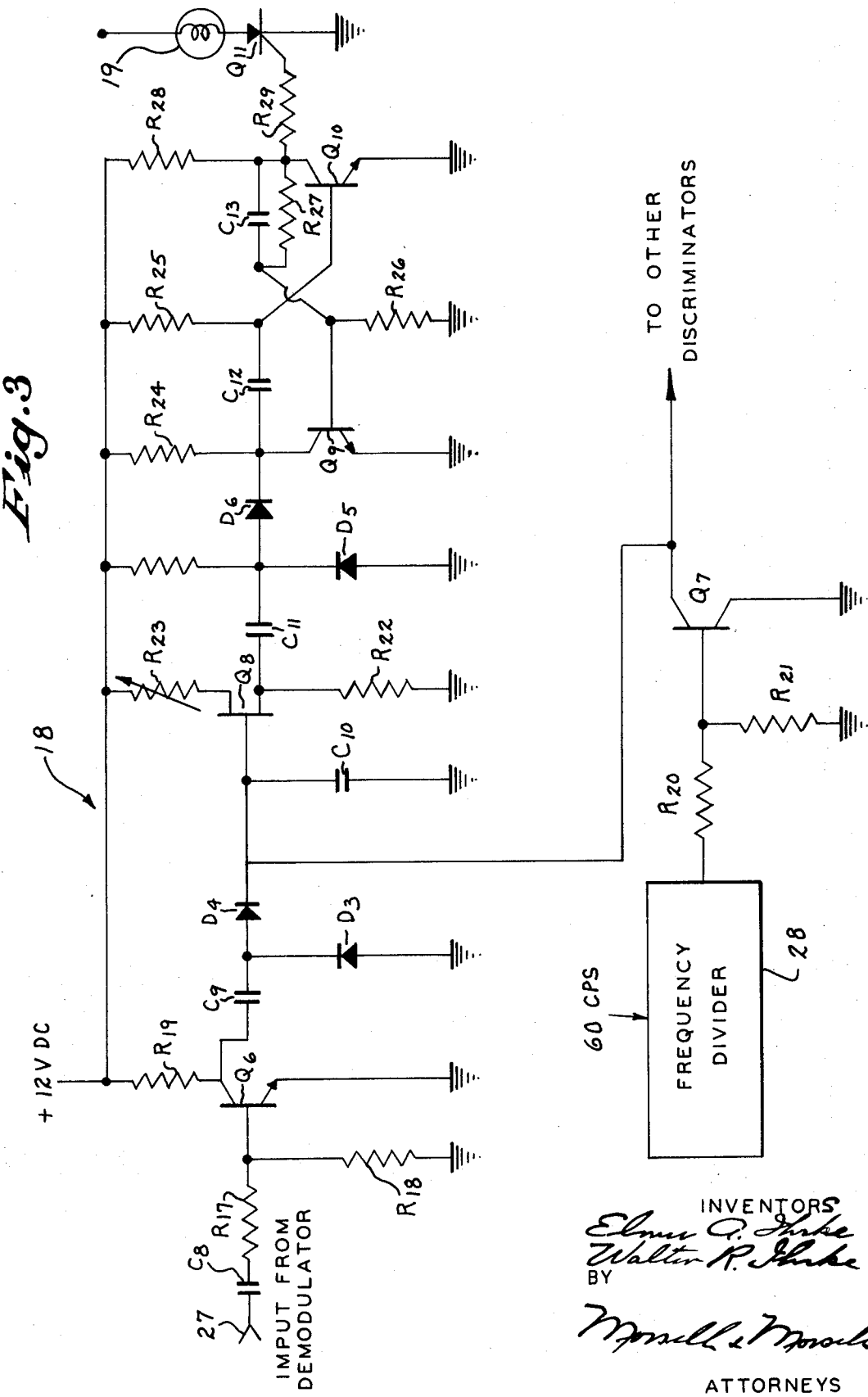

PITCH MEASUREMENT CIRCUIT

BACKGROUND OF THE INVENTION

This invention relates to musical training aids in general and more particularly to devices for measuring musical pitch. In the past it has been the practice of music instructors to measure their student's pitch by comparing the student's voice or instrument to a pitch pipe or piano or other instrument. However, because of the marked difference in timbre between various tones, such comparisons are subject to a high degree of guesswork on the instructor's part and are relatively inaccurate in the sense that, even if the instructor did detect an error in the student's response, he could not specify how sharp or flat it is.

Accordingly, it is an object of this invention to provide a scientific method and apparatus for measuring musical pitch.

It is a further object of this invention to provide pitch-measuring apparatus which is highly accurate and reliable in use and which is capable of indicating how sharp or flat a tone is.

It is an additional object of this invention to provide a pitch-measuring apparatus of the above-noted character which is relatively inexpensive in cost and which is adapted for use in conjunction with standard tape recorders.

SUMMARY OF THE INVENTION

In accordance with this invention, the above-noted objects are obtained by providing a reference signal indicating the pitch or sequence of pitchers that the musician is supposed to produce, then playing the reference signal while the musician is performing, picking up his tones with a microphone, comparing the output of the microphone with the reference signal, and indicating whether the musician is on pitch and, if not, whether he is sharp or flat. In one embodiment of the invention, the comparison between the output of the microphone and the reference signal is accomplished by means of a mixer circuit in which the two signals are mixed, a demodulator circuit which demodulates the mixed signal, and a plurality of frequency discriminator circuits which measure the frequency of the demodulated signal.

DESCRIPTION OF THE DRAWINGS

FIG. 1 is a block diagram of one illustrative embodiment of the invention;

FIG. 2 is a schematic circuit diagram of one suitable mixer circuit and demodulator circuit for the embodiment illustrated in FIG. 1; and FIG. 3 is a schematic circuit diagram of one suitable discriminator circuit for the embodiment illustrated in FIG. 1.

DETAILED DESCRIPTION OF THE INVENTION

In general terms, the pitch-measuring apparatus of this invention comprises means for accepting a melody in coded form from a taped recording, means for accepting a student's tones from a microphone circuit, means for mixing these two electrical signals, means for demodulating the resulting mixture to isolate the low-frequency component for discriminator circuit input, and means for indicating with signal lights whether the student is sharp, flat, or on pitch.

As illustrated in FIG. 1, the tape recorder 10 provides two outputs simultaneously. Track 2 contains a melody in coded form, while Track 1, heard in earphones 11, provides accompaniment for the melody performed by the student. The mixer circuit 12 has two inputs, one being the melody in coded form from Track 2, and the other being the student-produced tones picked up by the microphone 14.

Assuming, for purposes of illustration, that the musical sounds are from a singer, as the singer sings, the actual pitch of his voice is picked up by the microphone 14 and mixed with the melody in coded form in mixer circuit 12. The output of mixer circuit 12 is applied to a demodulator 16 whose output is applied to three frequency discriminator circuits 18, 20, and 22. The output of the demodulator circuit is a signal whose frequency is the difference between the vocal signal picked up by the microphone 14 and the melody in coded form from Track 2 of tape recorder 10. The amount of this difference will indicate whether the singer is singing on pitch or whether he is sharp or flat. The three discriminator circuits 18, 20 and 22 are accordingly tuned to detect the three conditions. As an example, discriminator circuit 18 would be tuned to detect the sharp condition, discriminator circuit 20 would be tuned to detect the on-pitch condition, and discriminator circuit 22 would be tuned to detect the flat condition. Each of the discriminator circuits has a corresponding output lamp 19, 21, and 23 which indicate when the corresponding condition is met. In accordance with the above-noted example, lamp 21 would light when the singer was singing on pitch, lamp 19 would light when he was singing sharp, and light 23 would light when he was singing flat.

Although the above-described general circuit can be implemented with any suitable prior art mixer circuit, demodulator circuit, and discriminator circuits, FIGS. 2 and 3 show schematic diagrams for a preferred mixer, demodulator, and discriminator circuits. In the circuits of FIGS. 2 and 3, the melody in coded form is not at the same pitch which the singer is supposed to be singing but, instead, is 40 cycles per second below the desired pitch. This simplifies the problem of determining whether the singer is singing too high or too low. If the melody in coded form where at the same pitch instead of 40 cycles below the melody which the singer is supposed to be singing, the on-pitch condition would be a difference of zero cycles per second between the output of the microphone and the melody in coded form. In case there is a difference other than zero, a phase-detecting circuit would have to be employed to distinguish whether the difference represented a sharp tone or a flat tone. By the use of a melody in coded form that is 40 cycles below the desired pitch, a difference of 40 cycles per second between the output of the microphone and the melody in coded form indicates the on-pitch condition, a signal in the 30's indicates a flat condition, and a signal in the 40's indicates a sharp condition. Accordingly, the circuits of FIGS. 2 and 3 are adapted for use under conditions where 40 cycles per second is the basis of comparison between the melody in coded form and the output of the microphone.

FIG. 2 shows the preferred mixer and demodulator circuits. Two input jacks 24 and 26 are provided for inputs from the microphone and from Track 2 of the tape recorder respectively. Transistor $Q_1$ and its associated circuit components acts as a preamplifier for the microphone input while transistor $Q_2$ acts as a preamplifier for the tape recorder input, and transistor $Q_3$ acts as a mixing device to mix the output of the two preamplifier transistors $Q_1$ and $Q_2$. The input from the microphone is applied to jack 24 and is developed across potentiometer $R_1$ the arm of which is coupled through a condenser $C_1$ to the base of transistor $Q_1$. In addition to receiving the signal developed across potentiometer $R_1$, the base of $q_1$ also receives a negative feedback signal through $R_2$ from the emitter resistor $R_3$ of $Q_3$. The input from the tape recorder through jack 26 is applied through potentiometer $R_6$ and capacitor $C_2$ to the base of transistor $Q_2$. The base of transistor $Q_2$ also receives a negative feedback signal from the emitter resistor $R_3$ of transistor $Q_3$ via resistor $R_7$. The collector resistor $R_4$ for transistor amplifier $Q_1$ also serves as the collector resistor for transistor $Q_2$ so that the two input signals are mixed together in resistor $R_4$ and the base circuit of transistor $Q_3$.

The output of transistor $Q_3$ is developed across its collector resistor $R_8$ and is coupled through capacitor $C_3$ to the base of transistor amplifier $Q_4$. A voltage divider network comprising resistors $R_{10}$ and $R_{11}$ sets a bias for transistor $Q_4$, whose output signal is developed by a collector resistor $R_{12}$ and emitter resistor $R_{13}$. The output signal of transistor $Q_4$ is coupled directly to an emitter follower transistor $Q_5$ through base resistor $R_{14}$. The output resistor $R_{15}$ of transistor $Q_5$ is coupled through capacitor $C_4$ to a rectifier network comprising the two diodes $D_1$ and $D_2$. The output of the rectifiers $D_1$ and $D_2$ is applied to a low-pass 40 cycle per second filter circuit comprising inductors $L_1$ and $L_2$ and capacitors $C_5$ and $C_6$. The output of the filter circuit is taken through resistor $R_{16}$ and capacitor $C_7$.

In the operation of the above-described mixer and demodulator circuit, the input from the microphone and from Track 2 of the tape recorder are amplified in transistors Q1 and Q2 and mixed together in the base circuit of transistor $Q_3$. Transistor $Q_4$ acts as an amplifier and transistor $Q_5$ acts as an impedance matching device for the rectifier circuit comprising diodes $D_1$ and $D_2$. The low-pass filter circuits comprising the inductors $L_1$ and $L_2$ and capacitors $C_5$ and $C_6$ reject the sum of the two signals and leave only their difference, which if the singer is singing on pitch should be exactly 40 cycles per second. If the singer is singing flat, the output will be in the 30's, and if the singer is singing sharp the output frequency will be in the 40's.

FIG. 3 illustrates one circuit arrangement for the discriminator circuit 18 of FIG. 1. Referring to FIG. 3, the input from the demodulator, which is the difference between the frequency of the melody in coded form and the pitch that the singer is singing, is applied through a capacitor $C_8$ and resistors $R_{17}$ and $R_{18}$ to the base of an amplifier transistor $Q_6$. The emitter of $Q_6$ is grounded and the collector is coupled to a load resistor $R_{19}$. The output signal of transistor $Q_6$ is applied through capacitor $C_9$ to a clamping circuit comprising the diodes $D_3$ and $D_4$. The signal appearing across capacitor $C_9$ is essentially a square wave, and the diodes $D_3$ and $D_4$ act to clamp the square wave on ground. The clamped square wave is then applied to an integrating capacitor $C_{10}$ which is periodically discharged by transistor $Q_7$ at a fixed rate of one discharge every four-fifteenths second. Transistor $Q_7$ receives its input to resistors $R_{20}$ and $R_{21}$ from a frequency divider 28 whose 60cycle input from the power line is divided by 16. The input from the demodulator causes the voltage of $C_{10}$ to rise toward the firing voltage required by unijunction transistor $Q_8$. If the design of the circuit $Q_8$, for example, allows the firing voltage of $Q_8$ to be reached in less than four-fifteenths second, the unijunction transistor $Q_8$ will discharge capacitor $C_{10}$ through resistor $R_{22}$, sending a pulse through capacitor $C_{11}$ to the succeeding stages and the lamp 19. If, on the other hand, the design of unijunction transistor $Q_8$ is such that the firing voltage of $Q_8$ is not reached in four-fifteenths second, then capacitor $C_{10}$ will be discharged by transistor $Q_7$ and no signal impulse will be given to succeeding stages, since unijunction transistor $Q_8$ was not fired.

Each of the unijunction transistor circuits is designed to fire at a predetermined minimum frequency corresponding to the three pitch conditions previously referred to as sharp, on-pitch, or flat. Although all discriminator circuits receive identical signals simultaneously, each discriminator circuit design determines whether or not its unijunction transistor has reached firing voltage in four-fifteenths second. Integrating capacitor $C_{10}$ is coupled to the emitter of unijunction transistor $Q_8$. The circuit values are selected so that the charge on capacitor $C_{10}$ will rise above the peak voltage for unijunction transistor $Q_8$ if and only if the frequency of the input from the demodulator is equal to a predetermined frequency of, for example, 45 cycles per second, which is 5 cycles above the on-pitch indication of 40 cycles per second. If the frequency of the input is below the predetermined value, the output pulses from transistor $Q_7$ will discharge the integrating capacitor $C_{10}$ before it reaches the firing level for unijunction transistor $Q_8$.

Assuming that the input signal has a frequency high enough to fire the unijunction transistor $Q_8$, an output signal is developed between the resistors $R_{22}$ and $R_{23}$. This output signal is coupled through capacitor $C_{11}$ to a clamping network comprising diodes $D_5$ and $D_6$. The positive-going wave form passed through diode $D_6$ is applied to the input terminal of a one-shot multi-vibrator comprising transistors $Q_9$ and $Q_{10}$ and their associated circuit components. The output signal of the one-shot multivibrator is coupled through $R_{29}$ to the trigger electrode of silicon-controlled rectifier $Q_{11}$. When the frequency of the incoming signal from the demodulator is sufficiently high to exceed the peak point voltage on the emitter of unijunction transistor $Q_8$, the gate of silicon-controller rectifier $Q_{11}$ will become activated by the first pulse, and the lamp 19 will accordingly be lit until the time interval designed into the one-shot multi-vibrator has elapsed. If, on the other hand, the frequency of the incoming signal is lower, i.e. if the singer begins to sing on pitch instead of sharp, the emitter of unijunction transistor $Q_8$ will be grounded before the charge on the capacitor $C_{10}$ builds up to the peak point and accordingly no gate will be applied to the trigger electrode on the silicon-controlled rectifier $Q_{11}$ and the lamp 19 will remain off.

The above-described discriminator circuit can be used for all of the discriminators 18, 20, and 22 (See FIG. 1). Alternately, any other suitable discriminator circuit can be utilized which will indicate the frequency of a variable frequency input signal that varies from approximately 35 to 45 cycles per second.

From the foregoing description it will be apparent that this invention provides a scientific method and apparatus for measuring pitch and indicating by suitable signals when a musician is on pitch or sharp or flat. And although this invention has been described in connection with one specific embodiment thereof, it should be understood that the invention is by no means limited to the disclosed embodiment since many modifications can be made in the disclosed structure without departing from the basic principles of operation. Accordingly, this invention includes all modifications which fall within the scope of the following claims.

What we claim is:

1. A pitch measurement circuit comprising:
   A. means for generating a reference signal which includes a sequence of electrical signals of different frequency which correspond to a sequence of pitches to be produced by a musician;
   B. a microphone for picking up a sequence of sounds produced by said musician and translating the sounds into an equivalent sequence of electrical signals;
   C. means for comparing the electrical output signals of said microphone with said reference signal; and
   D. means for instantaneously indicating the relative frequency of the output of said microphone with respect to said reference signal.

2. A pitch measurement circuit comprising:
   A. means for generating a reference signal which is consistently a fixed frequency below the frequency of a note to be produced by a musician;
   B. a microphone for picking up sounds produced by said musician and translating the sounds into equivalent electrical signals;
   C. means for comparing the output of said microphone with said reference signal; and
   D. means electrically connected with said comparing means for instantaneously indicating the relative frequency of the output of said microphone with respect to said reference signal to indicate whether the musician's note is sharp or whether it is flat and which it is.

3. A pitch measurement circuit as defined in claim 2 including adjustment means connected with said instantaneous indicating means for indicating the amount of difference between the frequency of the reference signal and the frequency of the output note which is required to actuate the indicating means.

4. A pitch measurement circuit comprising:
   A. means for recording a reference signals on one track of a tape recorder which indicates a sequence of pitches to be produced by a musician;
   B. means for recording an instrumental accompaniment for said sequence of pitches on another track of said tape recorder;
   C. means for simultaneously playing the reference signal and the instrumental accompaniment on said tape recorder;
   D. a microphone for picking up sounds of said musician and translating the sounds into equivalent electrical output signals;
   E. means for comparing the output of said microphone with said reference signal; and
   F. means for indicating the relative frequency of the output of said microphone with respect to said reference signal.

5. A pitch measurement circuit comprising:
   A. means for generating a reference signal which is of a predetermined frequency with respect to a note to be produced by a musician;
   B. a microphone for picking up a sound produced by said musician and translating the sound into an equivalent electrical signal;
   C. means for comparing the electrical output signal of said microphone with said reference signal;
   D. means for indicating the relative frequency of the output of said microphone with respect to said reference signal,
   E. said means for comparing the output of said microphone to said reference signal comprising a frequency mixer circuit;
   F. means for applying said reference signal and the output of said microphone to said mixer circuit; and
   G. a demodulator circuit coupled to the output of said mixer circuit,
   H. said means for indicating the relative frequency of the output of said microphone comprising a plurality of frequency discriminator circuits coupled in parallel to the output of said demodulator circuit, and said means also including separate indicators, one operable to indicate whether the musician is sharp and the other operable to indicate whether the musician is flat.

6. A pitch measurement circuit as defined in claim 5 wherein said frequency discriminator circuits each comprise an integrating capacitor coupled to the output of said demodulator, means for periodically shorting the charge on said integrating capacitor to discharge it, and a threshold circuit coupled to said integrating capacitor and operable to produce an output indication when the charge on said integrating capacitor exceeds a predetermined level.

7. A pitch measurement circuit as defined in claim 6 wherein said means for periodically shorting the charge on said integrating capacitor to discharge it comprises a frequency divider and electronic switch means coupled between the output of said frequency divider and said capacitor for periodically discharging the capacitor at a frequency determined by the frequency of said frequency divider.

8. A pitch measurement circuit as defined in claim 7 wherein said means for producing an output indication comprises a unijunction transistor coupled to said integrating capacitor, a silicon-controlled rectifier coupled to said unijunction transistor, and an electric indicator coupled to said silicon-controlled rectifier, said indicator being operable to indicate when the charge on said integrating capacitor exceeds a predetermined level.

* * * * *